United States Patent
Agarwal et al.

(10) Patent No.: US 9,244,959 B2
(45) Date of Patent: *Jan. 26, 2016

(54) COMPARING DATABASE PERFORMANCE WITHOUT BENCHMARK WORKLOADS

(71) Applicant: International Business Machines Corporation, Armonk, NY (US)

(72) Inventors: Manoj K. Agarwal, Noida (IN); Curt L. Cotner, Gilroy, CA (US); Amitava Kundu, Bangalore (IN); Rajesh Sambandhan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 423 days.

This patent is subject to a terminal disclaimer.

(21) Appl. No.: 13/899,624

(22) Filed: May 22, 2013

(65) Prior Publication Data

US 2014/0337364 A1    Nov. 13, 2014

Related U.S. Application Data

(63) Continuation of application No. 13/890,759, filed on May 9, 2013.

(51) Int. Cl.
*G06F 17/30* (2006.01)

(52) U.S. Cl.
CPC .... *G06F 17/30306* (2013.01); *G06F 17/30289* (2013.01)

(58) Field of Classification Search
USPC ...................................... 707/703, 609, 999.2
See application file for complete search history.

(56) References Cited

U.S. PATENT DOCUMENTS

| | | | |
|---|---|---|---|
| 6,732,124 B1 * | 5/2004 | Koseki et al. ........................ 1/1 |
| 7,155,459 B2 | 12/2006 | Chaudhuri et al. |
| 7,539,608 B1 * | 5/2009 | Dageville et al. ............... 703/21 |
| 7,664,798 B2 | 2/2010 | Wood et al. |
| 8,099,399 B2 | 1/2012 | Wilkinson et al. |
| 8,122,035 B2 * | 2/2012 | Childress et al. ............. 707/758 |
| 8,510,263 B2 * | 8/2013 | Essawi et al. ................. 707/607 |
| 2006/0179347 A1 * | 8/2006 | Anderson et al. ............... 714/16 |
| 2006/0218206 A1 * | 9/2006 | Bourbonnais et al. ........ 707/202 |
| 2007/0083564 A1 * | 4/2007 | Ramacher et al. ............ 707/200 |
| 2008/0091669 A1 | 4/2008 | Anderson et al. |
| 2009/0182728 A1 * | 7/2009 | Anderson ......................... 707/5 |
| 2012/0150791 A1 | 6/2012 | Willson |

OTHER PUBLICATIONS

Agarwal et al. "U.S. Appl. No. 13/483,778", filed May 30, 2012.

(Continued)

*Primary Examiner* — Debbie Le
(74) *Attorney, Agent, or Firm* — David Zwick; Mohammed Kashef (57) ABSTRACT

Database operation records are sequentially read from two or more log files. If the transaction identifier is new and the record is not an end-of-transaction record, an open transactions list entry is created. If the transaction identifier is new and the record is an end-of-transaction record, a transaction type list entry is created or updated. If the transaction identifier is not new and is not an end-of-transaction record, an open transactions list entry is updated. If the transaction identifier is not new and the record is an end-of-transaction record, a transaction type list entry is created or updated. When all log file records are read, analytical comparison between the information associated with two or more of the log files in data fields in the transaction type list entries is performed.

6 Claims, 5 Drawing Sheets

(56) References Cited

OTHER PUBLICATIONS

Curino, et al. "Schism: a Workload-Driven Approach to Database Replication and Partitioning". Proceedings of the VLDB Endowment, vol. 3, No. 1. Copyright 2010 VLDB. pp. 48-57.

IBM. "System and Method for Database System Historical Resource Utilization Modeling and Prediction (DBSHRUMP) Based on Workload Characterization and Runtime Monitoring Information". IBM. IP.com Prior Art Database Disclosure. IP.com Disclosure No. IPCOM000185470D. Publication Date: Jul. 27, 2009.

Levin. "Tip: Comparing Database Workloads With "Qure Analyzer"—Part II". [onine]. [Retrieved on: Jan. 28, 2013] <http://www.dbsophic.com/Tips/tip-comparing-db-workload-part-2.html>.

Agarwal, et al., "U.S. Appl. No. 13/890,759", filed May 9, 2013.

\* cited by examiner

COMPARING DATABASE PERFORMANCE WITHOUT BENCHMARK WORKLOADS

CROSS-REFERENCE TO RELATED APPLICATIONS

This application is a continuation of U.S. patent application Ser. No. 13/890,759 filed on May 9, 2013, the entire content and disclosure of which is incorporated herein by reference.

FIELD OF THE INVENTION

The present invention relates generally to comparing the performance between different versions of database systems, and more particularly to performing such a comparison between live workload log data rather than between benchmark workload log data.

BACKGROUND OF THE INVENTION

Databases are routinely upgraded to new versions, or new software patches are applied on existing versions, or the database is migrated to a new database management system. In these situations, it is typical to compare the performance of a benchmark transaction workload in the new database environment to the same benchmark transaction workload in the old database environment. A benchmark transaction workload is typically a sequence of different transactions that will "exercise" the database. To compare the performances of the benchmark transaction workloads, corresponding instances of transactions in the new and old database environments are matched, and analysis is performed between the matching transactions. When running benchmark transaction workloads for performance comparisons, it is usually desirable to run the workloads under controlled conditions. Typically, this requires that the benchmark workload is the only workload running on the system being analyzed. This usually means that system or systems must be taken out of production mode, at least while the benchmark workload is executing. In database production environments with high availability requirements, taking the system out of production mode may present a significant obstacle to performing benchmarking analysis activities.

In a typical database environment, each transaction is, for example, a sequence of one or more Structured Query Language (SQL) statements. Typically, database transactions are multi-level transactions. That is, each transaction can include several SQL statements. In addition, while the SQL log records of a transaction will usually appear in the proper order in a database transaction log file, the database operation records from multiple transactions can be intermixed. Further, the different executions of a transaction workload will typically result in different sequences of database operation transaction log file records. These factors can complicate matching of transactions between database transaction log files.

SUMMARY

Embodiments of the present invention disclose a method, computer program product, and system for comparing the performance of databases executing comparable production workloads. Each production workload includes database transactions, and each database transaction includes one or more database operations. Each production workload has an associated log file containing records recording the executions of the database operations. Each log file record includes a transaction identifier, a database operation statement type, the host variables in the database operation statement, database operation execution information, and an end-of-transaction indicator indicating if the record is the end-of-transaction record of the transaction to which the database operation belongs. Database operation records are sequentially read from two or more log files. In response to determining that the transaction identifier in a database operation record read from a log file has not been included in any previous database operation record read from the log file, and determining that the database operation record is not an end-of-transaction record, a list entry associated with the transaction identifier and the database operation record in an open transactions data structure is created. In response to determining that the transaction identifier in a database operation record read from a log file has not been included in any previous database operation record read from the log file, and determining that the database operation record is an end-of-transaction record, a list entry is created in the transaction type data structure associated with the database operation statement type and the host variables in the database operation statement, and including database operation execution information in a set of data fields in the entry associated with the log file, or updating such a list entry if such an entry exists and including such information in the set of data fields in the entry associated with the log file. In response to determining that the transaction identifier in a database operation record read from a log file has been included in a previous database operation record read from the log file, and determining that the database operation record is not an end-of-transaction record, updating the list entry associated with the database operation statement type and the host variables in the database operation statement in the open transactions data structure, and including database operation execution information in a set of data fields in the entry associated with the log file. In response to determining that the transaction identifier in a database operation record read from a log file has been included in a previous database operation record read from the log file, and determining that the database operation record is an end-of-transaction record, a list entry associated with the database operation statement type and the host variables in the database operation statement is created in the transaction type data structure, and including database operation execution information in a set of data fields in the entry associated with the log file, or updating such a list entry if such an entry does not exist and including such information in the set of data fields in the entry associated with the log file. And, in response to determining that the last record from all of the two or more log files has been read, performing an analytical comparison between the information associated with two or more of the log files in data fields in a list entry in the transaction type data structure.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

In most production database environments, workloads are generally repetitive during various times of the day, week, month, and year. For example, for an online production database environment, customers may access the online system during the same hours every weekday, and perform the same basic set of transactions. Every night, there may be maintenance performed on the database that entails running the same basic set of maintenance transactions. Every weekend, month-end, and year-end, there may be a standard set of production reports and maintenance transactions that are run that perform the same basic set of transactions. In such an environment, useful pre- and post-upgrade analytical performance comparison information can be generated by comparing similar, although not exact, transactions over corresponding time periods. This eliminates the traditional requirement of having to take the system or systems out of production mode so as to run benchmark transaction workloads. Embodiments of the invention disclose generally a method, system, and computer program product for comparing transactions from two separate transaction log files that match at least on a SQL statement and host variable level.

In a preferred embodiment, the different transaction types present in a first transaction log file are identified from a single read pass through the first transaction log file. Comparison information is added to the identified transaction types from a single read pass through a second transaction log file. Comparison performance analysis can then be performed for transaction types that are present in both transaction log files.

Embodiments of the present invention will now be described in detail with reference to the accompanying drawings.

Figure 1:
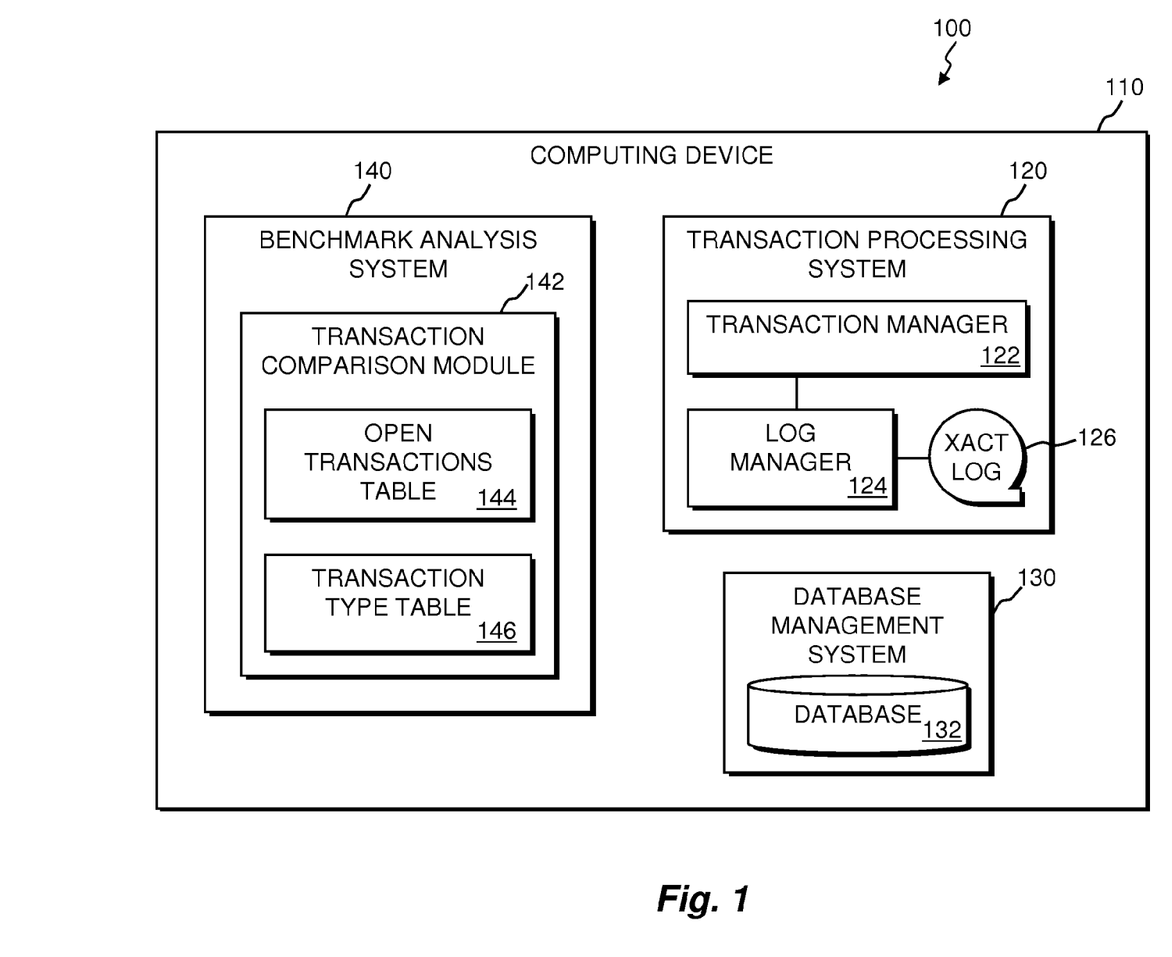
FIG. 1 is a functional block diagram illustrating a performance comparison system in accordance with an embodiment of the present invention.

FIG. 1 is a functional block diagram illustrating performance comparison system 100 in accordance with an embodiment of the present invention. Performance comparison system 100 includes computing device 110, which further includes transaction processing system 120, database management system 130, and benchmark analysis system 140.

In preferred embodiments of the invention, computing device 110 can be, for example, a mainframe or minicomputer, a laptop, a netbook personal computer (PC), or a desktop computer. Performance comparison system 100 is shown as being wholly implemented on computing device 110. However, performance comparison system 100 may operate in a distributed environment in which one or more of its components are implemented across a plurality of computing devices that communicate over a network, such as a local area network (LAN) or a wide area network (WAN) such as the Internet. For example, benchmark analysis system 140 may operate on a separate computing device. In general, performance comparison system 100 can execute on any computing device 110, or combination of computing devices, satisfying desired implementation requirements, and as described in relation to FIG. 5.

Transaction processing system 120 includes transaction manager 122, log manager 124, and transaction log file 126. Transaction manager 122 manages the processes that execute transactions against database 132 via database management system 130. Transaction manager 122 also manages all transactions so as to maintain data consistency in database 132. This is accomplished through the use of log manager 124. Log manager 124, among its other activities, records each database operation of a transaction workload, including the host variables of the database operation, such as the execution of each SQL statement in a transaction, in a database operation record to transaction log file 126.

Figure 5:
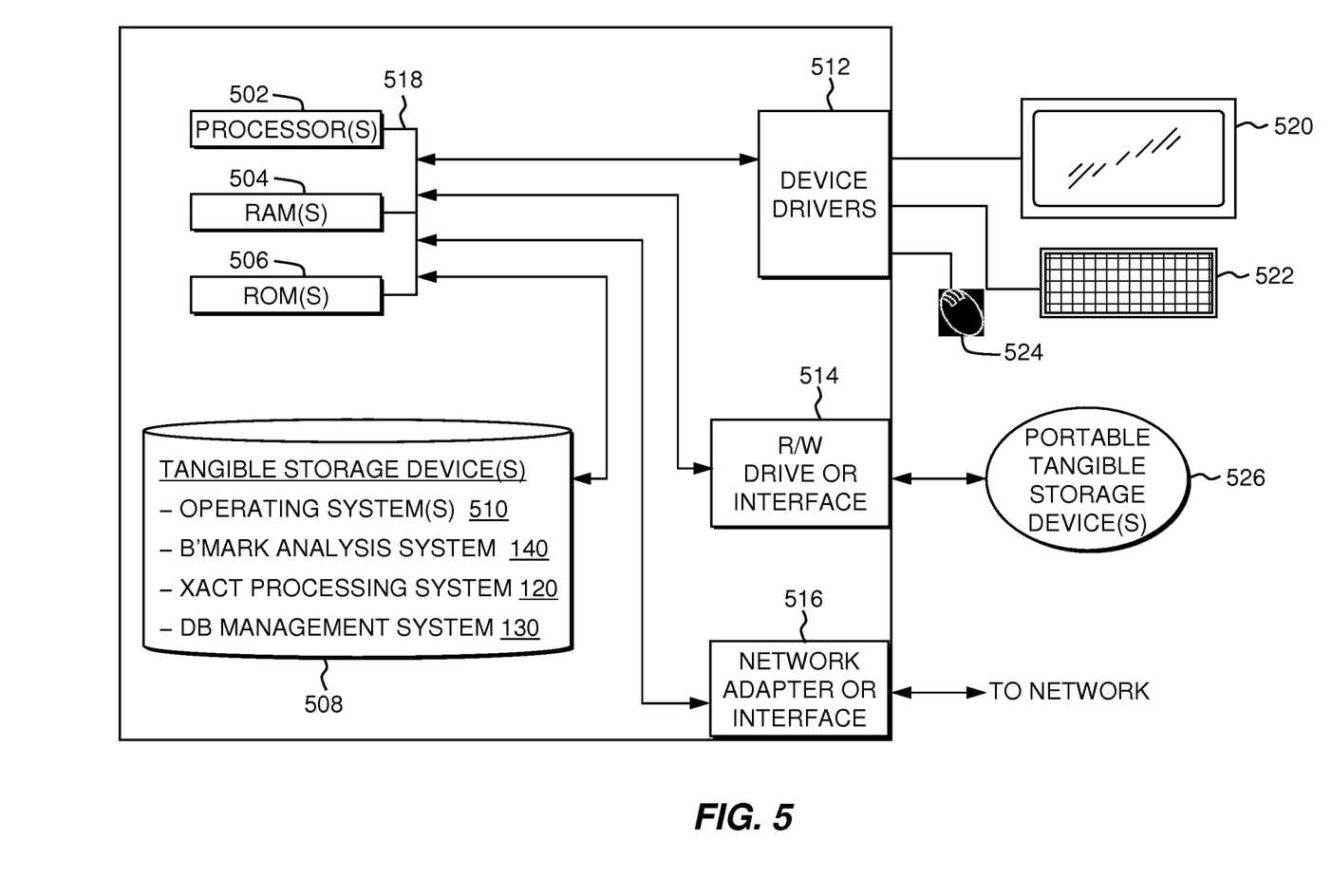
FIG. 5 is a block diagram of components of the computing device of FIG. 1 executing the performance comparison system, in accordance with an embodiment of the present invention.

Database management system 130 includes database 132, which may reside, for example, on computer-readable tangible storage device(s) 508 (see FIG. 5). Database management system 130 manages access to database 132, and manages the resources associated with database 132, such as disk space.

Benchmark analysis system 140 operates generally to analyze production performance data between similar transactions, preferably executed over corresponding time periods, and provide systems and applications programmers and systems administrators information to determine, for example, the most efficient organization of a database 132, or of a transaction workload, or for determining the most efficient database management system 130 or transaction processing system 120. The information that benchmark analysis system 140 processes is preferably derived from one or more transaction log files 126. For example, the transaction log file 126 information pertaining to two different executions of a production workload are stored on disk, such as computer-readable tangible storage device 508, after each production workload completes, and this information is made available to benchmark analysis system 140 for analysis.

Benchmark analysis system 140 includes transaction comparison module 142. Transaction comparison module 142, the operation of which will be described in more detail below, operates generally to identify transactions between different executions of a production transaction workload that match, for example, on a SQL statement and host variable level. These matching transactions can then be analyzed, for example, by benchmark analysis system 140, to provide the information stated above.

Embodiments of the invention are described with respect to the components and their functionality as presented in FIG. 1. Other embodiments of the invention may perform the invention as claimed with different functional boundaries between components. For example, the functionality of transaction comparison module 142 may be implemented as a standalone component, or as a function of transaction processing system 120.

A production transaction workload typically includes a sequence of database transactions. Each database transaction will typically comprise a sequence of database operations that execute database programming statements, for example, a sequence of SQL statement executions. When a series of database transactions are executed, for example, by transaction processing system 120, the SQL statements of a transaction are typically executed in an interleaved manner with the SQL statements of other database transactions of the production transaction workload. Thus, although the database transactions may execute in sequence, their underlying SQL statements can be interleaved with SQL statements of other transactions, and the corresponding transaction log file 126 records will be similarly interleaved. Further, different executions of the same production transaction workload can produce different execution sequences of the underlying SQL transactions. This could be due to such factors as I/O scheduling by the operating system, I/O delay, network delay, locking and latching within the database, etc. Although the execution of the underlying SQL statements of different transactions may be interleaved, the SQL statements in a given transaction will execute in order, and will appear in the transaction log file 126 in order.

In preferred embodiments, all SQL records for a transaction will appear in a transaction log file 126 in the order of execution within the transaction, even though the SQL records of one transaction may be interleaved with the SQL records of another transaction. Thus, if an end-of-transaction SQL record appears in transaction log file 126, then no other SQL records for this transaction will appear in the transaction log file following the end-of-transaction record.

Tables 1A and 2A illustrate examples from two different transaction log files 126 of SQL statement execution transaction log file records from two production transaction workloads. Each SQL record includes: a transaction log file record number; the transaction identifier of the transaction to which the SQL record is associated; the SQL statement type, such as SELECT, UPDATE, COMMIT, including the host variables in the statement, such as database table and field names; an end-of-transaction indicator to indicate whether the SQL statement was the last statement of the transaction; and the SQL statement execution start and end timestamps.

Tables 1B and 2B are transaction type summaries for information gathered from the SQL execution records shown in tables 1A and 2A, respectively. Each summary table 1B and 2B shows information for the different transaction types present in the corresponding example transaction log files 1A and 2A. In embodiments of the invention, a unique transaction type refers to a transaction comprising one or more SQL statements that reference a certain set of host variables. Thus, two transactions of the same type can perform operations on different database records. From table 1B, for example, it is shown that there are two instances, or occurrences, of transaction type 2, comprising SQL statements A-B. In table 1A, these two transactions occur with transaction log file records 1 and 4, having transaction ID T1, and records 6 and 7, having transaction ID T3. The total response time for a transaction type is the sum of the response times for each instance of the transaction type. In a preferred embodiment, the response time for a transaction is interval duration from the execution start time of the first SQL statement of the transaction to the execution end time of the last SQL statement of the transaction.

TABLE 1A

First Transaction Log File Transactions

| Log file Record No. | Transaction ID | SQL Statement | EOT Indicator | SQL Start/End Time |
|---|---|---|---|---|
| 1 | T1 | A | — | 0/1 |
| 2 | T2 | C | — | 1/2 |
| 3 | T2 | A | — | 2/3 |
| 4 | T1 | B | EOT | 3/4 |
| 5 | T2 | D | EOT | 4/5 |
| 6 | T3 | A | — | 5/6 |
| 7 | T3 | B | EOT | 6/7 |
| 8 | T4 | A | EOT | 7/8 |

TABLE 1B

First Transaction Log File Transactions Summary

| Transaction Type | Instances | SQL Statements | Total Response Time |
|---|---|---|---|
| 1 | 1 | A | 1 |
| 2 | 2 | A-B | 6 |
| 3 | 1 | C-A-D | 4 |

TABLE 2A

Second Transaction Log File Transactions

| Log file Record No. | Transaction ID | SQL Statement | EOT Indicator | SQL Start/End Time |
|---|---|---|---|---|
| 1 | T1 | A | — | 0/10 |
| 2 | T2 | C | — | 10/20 |
| 3 | T2 | A | — | 20/30 |
| 4 | T1 | B | EOT | 30/40 |
| 5 | T2 | D | EOT | 40/50 |
| 6 | T3 | A | — | 50/60 |
| 7 | T3 | B | EOT | 60/70 |
| 8 | T4 | A | EOT | 70/80 |
| 9 | T5 | A | — | 80/90 |
| 10 | T5 | E | EOT | 90/100 |
| 11 | T6 | C | — | 100/110 |
| 12 | T7 | C | — | 110/120 |
| 13 | T6 | D | EOT | 120/130 |
| 14 | T7 | D | EOT | 130/140 |

TABLE 2B

First Transaction Log File Transactions Summary

| Transaction Type | Instances | SQL Statements | Total Response Time |
|---|---|---|---|
| 1 | 1 | A | 10 |
| 2 | 2 | A-B | 60 |
| 3 | 1 | C-A-D | 40 |
| 4 | 1 | A-E | 20 |
| 5 | 2 | C-D | 60 |

Transaction comparison module 142, the operation of which will be explained in more detail below with respect to FIG. 2, includes open transactions table 144, and transaction type table 146. Open transactions table 144 is used by transaction comparison module 142 to record the SQL statements in individual transactions as SQL execution records are sequentially read from a transaction log file 126. In various embodiments, the table comprises singly, doubly or circularly linked lists. The linked list entries represent SQL execution records with one linked list per transaction ID. The entries are linked in the order that the corresponding SQL statements appear in the transaction to which the SQL execution records belong. The double or circular linking allows for easy reverse traversal of the entries to get information in the first SQL execution record entry of a transaction when the last SQL execution record of the transaction is read.

Transaction type table 146 is used by transaction comparison module 142 to store summary information for each transaction type found in the transaction log files 126 being compared. In one embodiment of the invention, the table comprises linked lists of SQL statement entries where each list, and usually portions thereof starting at the list head, represents the different transactions that appear in the transaction log files 126, at least to the SQL statement and host variable level. The linked list entries are linked in the order that the SQL statements appear in the associated transaction. In the exemplary embodiment, the linking is done in a tree and leaf manner such that all transactions that start with a particular SQL statement have the same linked list entry for their link list head. Branches extending from a link list head represent transactions comprising different SQL statements, all having one or more SQL statements in common. For example, the list entries for two transactions comprising SQL statements A-B-C and A-D-E would both share the same "A" SQL statement linked list entry as their link list head. A third list for a transaction comprising SQL statements A-B-C-X-Y would include the linked list entries for the list representing the A-B-C transaction. Defining transaction type table 146 in this "transaction tree" form may allow for an efficient use of computing resources in terms of memory usage. Other embodiments of the invention may use different definitions of transaction type table 146.

Each SQL linked list entry in a list in transaction type table 146 has a set of data fields that includes performance and other information, such as the number of instances in a transaction log file 126 of a transaction ending with the SQL statement, and the total transaction execution time for all instances of transactions ending with the SQL statement. Each SQL linked list entry has one set of data fields for each transaction log file 126 that is read as part of a performance comparison analysis. As will be described below, if a SQL linked list entry represents an end-of-transaction SQL statement for some transaction, the set of fields will not be empty. For example, for the A-B-C and A-B-C-X-Y transaction lists, both the "C" SQL linked list entry and the "Y" SQL linked list entry of the A-B-C-X-Y list will include performance information because both are end-of-transaction SQL statement linked list entries for a transaction.

Figure 2:
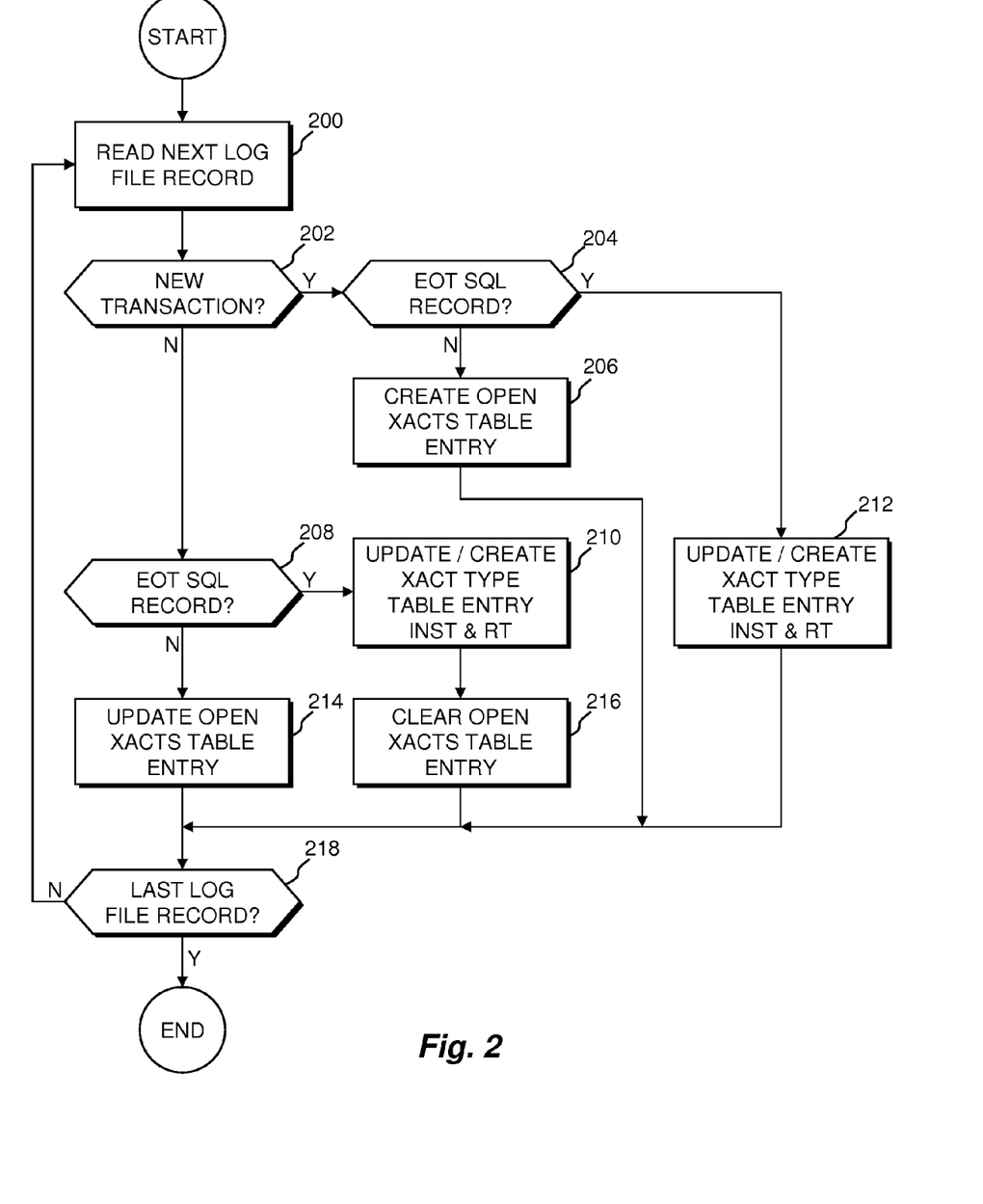
FIG. 2 is a flowchart illustrating operational steps of the transaction comparison module of the benchmark analysis system within the performance comparison system of FIG. 1, in accordance with an embodiment of the present invention.

FIG. 2 is a flowchart illustrating operational steps of transaction comparison module 142 of benchmark analysis system 140 within performance comparison system 100, in accordance with an embodiment of the present invention. The process represented by the flowchart is generally executed for each transaction log file 126 that is read as part of a comparison of production workloads.

Processing begins when transaction comparison module 142 reads the next (or first) SQL execution log file record from a transaction log file 126 (step 200). If a head of list entry in open transactions table 144 does not exist for the transaction to which the SQL execution log file record belongs (decision step 202, "Y" branch), indicating that this is the first SQL execution log file record of a transaction, and the SQL execution log file record is not an end-of-transaction record (decision step 204, "N" branch), indicating that the transaction consists of two or more SQL statements, a new list head entry is created in open transactions table 144 (step 206). If the SQL execution log file record is not the last record in the transaction log files 126 (decision step 218, "N" branch), the next record in the transaction log file is read (step 200) and processed.

If the SQL execution log file record is a new transaction (decision step 202, "Y" branch) and it is also an end-of-transaction record (decision step 204, "Y" branch), indicating that the transaction consists of a single SQL statement, then an open transactions table 144 list entry is not created. Rather, a single SQL statement transaction type table 146 list entry is created, if the SQL execution log file record is the first occurrence of this transaction type in the transaction log files 126, or the existing transaction type table 146 list entry is updated. In either case, data fields in the single SQL statement of the list entry associated with the current transaction log file 126 being processed are updated by incrementing the instance count (abbreviated in the flowchart and subsequent figures as "INST"), and adding the transaction execution time to the total transaction execution time, or response time (abbreviated in the flowchart and subsequent figures as "RT") (step 212). If the SQL execution log file record is not the last record in the transaction log files 126 (decision step 218, "N" branch), the next record in the transaction log file is read (step 200) and processed.

If the SQL execution log file record is not a new transaction (decision step 202, "N" branch) and it is not an end-of-transaction record (decision step 208, "N" branch), then the SQL execution log file record represents the next, but not last, SQL statement in the transaction, and the open transactions table 144 list entry for the transaction is updated by adding a new SQL execution record linked list entry to the end of the list entry (step 214). If the SQL execution log file record is not the last record in the transaction log files 126 (decision step 218, "N" branch), the next record in the transaction log file is read (step 200) and processed.

If the SQL execution log file record is not a new transaction (decision step 202, "N" branch) and it is an end-of-transaction record (decision step 204, "Y" branch), then, if a transaction type table 146 list entry exists for the transaction type to which the end-of-transaction SQL statement belongs, the existing transaction type table 146 list entry data fields in the end-of-transaction SQL statement linked list entry associated with the current transaction log file 126 being processed are updated by incrementing the instance count and adding the transaction execution time to the total transaction execution time (step 210).

Determining if a transaction type table 146 list entry exists for the transaction type to which the end-of-transaction SQL statement belongs may be accomplished, for example, by stepping down the open transactions table 144 list entry for a transaction, and determining if a corresponding list entry exists in transaction type table 146. If a corresponding list entry in transaction type table 146 does not exist, a list entry is created by adding a new list head entry, or one or more leaf entries. Determining the transaction execution time can be accomplished, for example, by subtracting the execution start time of the SQL statement execution record entry of a transaction in an open transactions table 144 list head entry, which will be accessed with reference to step 210 when determining if a corresponding list entry exists in transaction type table 146, from the execution end time of the end-of-transaction SQL statement record.

If a transaction type table 146 list entry does not exist for the transaction type to which the end-of-transaction SQL statement belongs, a list is created, and the end-of-transaction SQL statement entry is updated by incrementing the instance count and adding the transaction execution time to the total transaction execution time (also step 210). As mentioned above, transaction type list entries in the transaction type table are in a tree and leaf form such that transaction types having the same first SQL statement will share a common list entry list head. If any of the next SQL statements in the different transaction types are the same, the transaction type list entries will also share these SQL statement linked list entries. Thus, a SQL statement linked list entry in the middle of a transaction type list entry can be an end-of-transaction SQL statement. As described above, this would be the case for a first transaction consisting of SQL statements A-B-C, and a second transaction consisting of SQL statements A-B-C-X-Y. In this exemplary embodiment, if a SQL statement linked list entry in a transaction type list entry has non-empty data fields, then the SQL statement linked list entry represents the end-of-transaction SQL statement for a transaction type found in the transaction log file 126 associated with the data fields that begins at the transaction type list head and includes, in order, the SQL transaction linked list entries through to the end-of-transaction SQL statement linked list entry. The open transactions table entry for this transaction is then cleared to free up the associated memory resources (step 216). If the SQL execution log file record is not the last record in the transaction log files 126 (decision step 218, "N" branch), the next record in the transaction log file is read (step 200) and processed.

When the last record of the last transaction log file 126 has been read and processed (decision step 218, "Y" branch), execution of transaction comparison module 142 ends.

Figure 3:
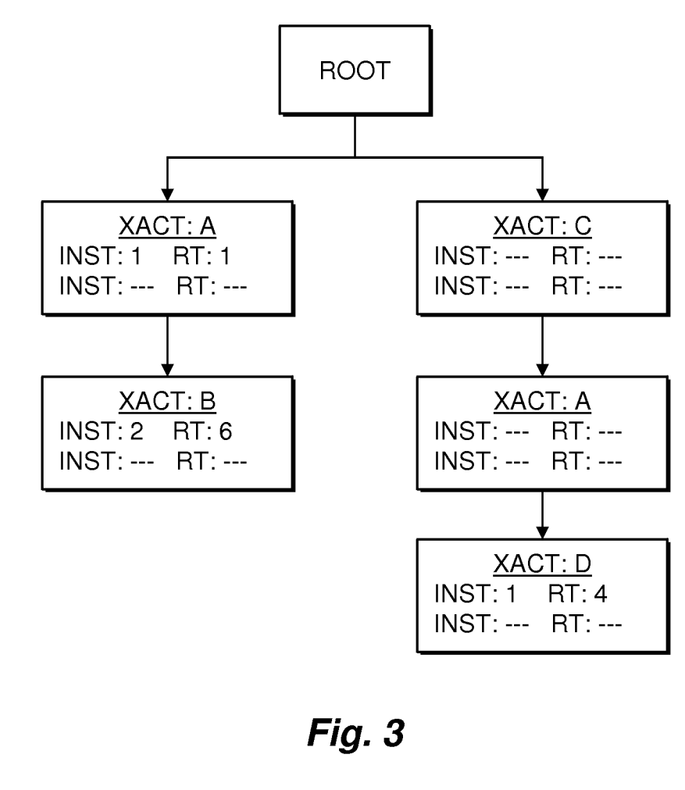
FIG. 3 is a transaction tree illustrating a graphical representation of certain information from an example set of transactions from a transaction workload, in accordance with an embodiment of the present invention.

FIG. 3 is a transaction tree illustrating a graphical representation of information from the example set of transactions from a transaction workload shown in Table 1A, in accordance with an embodiment of the present invention. This transaction tree would be derived from a transaction type table 146 populated after processing the example set of transactions from the transaction workload shown in Table 1A, in accordance to the process described with relation to FIG. 2. As shown, there are three transaction types: A; A-B; and C-A-D. As mentioned above, each leaf has two sets of data fields, each set associated with one of the two transaction log files being processed.

Figure 4:
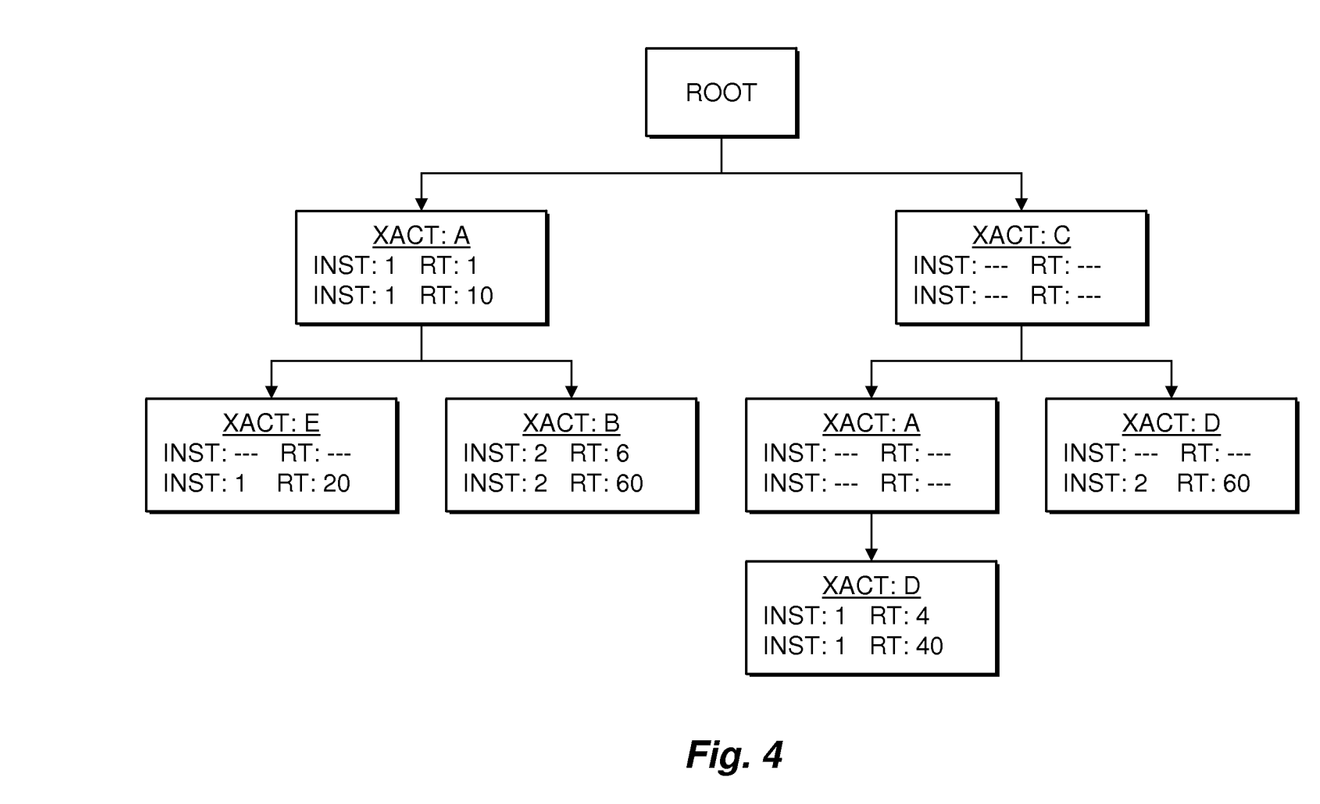
FIG. 4 is a transaction tree illustrating a graphical representation of certain information from two example sets of transactions from two transaction workloads, in accordance with an embodiment of the present invention.

FIG. 4 is a transaction tree illustrating a graphical representation of information from processing the two example sets of transactions from the transaction workloads shown in Tables 1A and 2A. As shown, a transaction type consisting of a single SQL statement type "A" occurs in both of the example sets of transactions, as indicated by the transaction type "A" entry having instance and response time data in both sets of fields. Referring to the transaction tree graphical representation in FIG. 4, after all transaction log files 126 have been processed, comparisons may be made between transaction types that are present in the two processed transaction log files—in this case, transaction types A, A-B, and C-A-D.

In the exemplary embodiment described above, transaction type list entries in transaction type table 146 are differentiated only down to the SQL statement and host variable level. In other embodiments, transaction types can be differentiated based on different information available in the SQL execution log file records. For example, transaction type differentiation can be based on specific host variable values or ranges of values. For example, if there are 100 customers divided into logical groupings, for example, customers 1-33, 34-66, and 67-100, or based on another customer record variable, and processing does not break out the customers by logical grouping, a SQL statement can be inserted into the transaction that breaks out customers by logical grouping, but otherwise performs all other operations as before. By including this break out, this logical customer grouping will appear in the log file SQL statement execution record and additional leafs will be added to the transaction tree, thus allowing tracking of SQL transactions at a finer granularity. Additional differentiation can also be based on specific SQL statement execution times, or SQL statement execution or transaction execution return codes. Regarding differentiation based on execution return codes, it may be informative to compare the occurrences of failure return codes from transaction log files from before and after a change to database.

FIG. 5 shows a block diagram of components of the computing device 110 of performance comparison system 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 can include one or more processors 502, one or more computer-readable RAMs 504, one or more computer-readable ROMs 506, one or more computer-readable tangible storage devices 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within a system.

One or more operating systems 510, benchmark analysis system 140, transaction processing system 120, and database management system 130 are stored on one or more of the computer-readable tangible storage devices 508 for execution by one or more of the processors 502 via one or more of the respective RAMs 504 (which typically include cache memory). In the illustrated embodiment, each of the computer-readable tangible storage devices 508 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 can also include a R/W drive or interface 514 to read from and write to one or more portable computer-readable tangible storage devices 526. Benchmark analysis system 140, transaction processing system 120, and database management system 130 on computing device 110 can be stored on one or more of the portable computer-readable tangible storage devices 526, read via the respective R/W drive or interface 514 and loaded into the respective computer-readable tangible storage device 508.

Computing device 110 can also include a network adapter or interface 516, such as a TCP/IP adapter card for communications via a cable, or a wireless communication adapter. Benchmark analysis system 140, transaction processing system 120, and database management system 130 on computing device 110 can be downloaded to the computing device from an external computer or external storage device via a network (for example, the Internet, a local area network or other, wide area network or wireless network) and network adapter or interface 516. From the network adapter or interface 516, the programs are loaded into the computer-readable tangible storage device 508. The network may include copper wires, optical fibers, wireless transmission, routers, firewalls, switches, gateway computers and/or edge servers.

Computing device 110 can also include a display screen 520, a keyboard or keypad 522, and a computer mouse or touchpad 524. Device drivers 512 interface with display screen 520 for imaging, keyboard or keypad 522, computer mouse or touchpad 524, and/or display screen 520 for pressure sensing of alphanumeric character entry and user selections. The device drivers 512, R/W drive or interface 514 and network adapter or interface 516 can comprise hardware and software (stored in computer-readable tangible storage device 508 and/or ROM 506).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed for a performance comparison system. However, numerous modifications and substitutions can be made without deviating from the scope of the present invention. Therefore, the present invention has been disclosed by way of example and not limitation.

What is claimed is:

1. A method for comparing the performance of databases executing comparable production workloads, each production workload including database transactions, each database transaction including one or more database operations, each production workload having an associated log file containing records recording the executions on a computer of the database operations, each log file record including a transaction identifier, a database operation statement type, the host variables in the database operation statement, database operation execution information, and an end-of-transaction indicator indicating if the record is the end-of-transaction record of the transaction to which the database operation belongs, of the method comprising:

sequentially reading the database operation records from two or more log files;

in response to determining that the transaction identifier in a database operation record read from a log file has not been included in any previous database operation record read from the log file, and determining that the database operation record is not an end-of-transaction record, creating a list entry associated with the transaction identifier and the database operation record in an open transactions data structure;

in response to determining that the transaction identifier in a database operation record read from a log file has not been included in any previous database operation record read from the log file, and determining that the database operation record is an end-of-transaction record, creating a list entry in the transaction type data structure associated with the database operation statement type and the host variables in the database operation statement, and including database operation execution information in a set of data fields in the entry associated with the log file, or updating such a list entry if such an entry exists and including such information in the set of data fields in the entry associated with the log file;

in response to determining that the transaction identifier in a database operation record read from a log file has been included in a previous database operation record read from the log file, and determining that the database operation record is not an end-of-transaction record, updating the list entry associated with the database operation statement type and the host variables in the database operation statement in the open transactions data structure, and including database operation execution information in a set of data fields in the entry associated with the log file;

in response to determining that the transaction identifier in a database operation record read from a log file has been included in a previous database operation record read from the log file, and determining that the database operation record is an end-of-transaction record, creating a list entry associated with the database operation statement type and the host variables in the database operation statement in the transaction type data structure, and including database operation execution information in a set of data fields in the entry associated with the log file, or updating such a list entry if such an entry does not exist and including such information in the set of data fields in the entry associated with the log file; and in response to determining that the last record from all of the two or more log files has been read, performing an analytical comparison between the information associated with two or more of the log files in data fields in a list entry in the transaction type data structure.

2. A method in accordance with claim 1, wherein in response to determining that the transaction identifier in a database operation record read from a log file has been included in a previous database operation record read from the log file, and determining that the database operation record is an end-of-transaction record further includes clearing the list entry associated with the transaction identifier in the open transactions data structure.

3. A method in accordance with claim 1, wherein creating a list entry in the transaction type data structure comprises creating a linked list having a linked list head corresponding to the first database operation statement type and the host variables in the first database operation record associated with a transaction identifier, a linked list end corresponding to the database operation statement type and the host variables in the end-of-transaction database operation record associated with a transaction identifier, and intermediate linked list entries corresponding to the database operation statement type and the host variables in any database operation records between the first database operation record and the end-of-transaction database operation record associated with the transaction identifier, the linked list linked in the order of the database operation records in the transaction.

4. A method in accordance with claim 3, wherein updating a list entry in the transaction type data structure comprises one of:

identifying a linked list head and linked list entries linked in order from the linked list head that match in order from the first database operation record of the transaction to the database operation statement types and the host variables in the database operation records associated with a transaction identifier, and including the transaction execution information in a set of data fields in the linked list entry associated with the end-of-transaction database operation record associated with the transaction identifier; and identifying the longest chain of a linked list head and linked list entries linked in order from the linked list head that partially match, in order from the first database operation record of the transaction, to the database operation statement types and the host variables in the database operation records associated with a transaction identifier, and linking, to the last linked list entry of the longest chain, one or more new linked list entries corresponding to the unmatched database operation statement types and the host variables in the database operation records associated with a transaction identifier, and including the transaction execution information in a set of data fields in the linked list entry associated with the end-of-transaction database operation record associated with the transaction identifier.

5. A method in accordance with claim 1, wherein creating a list entry in the open transactions data structure comprises creating a linked list having a linked list head associated with a transaction identifier and corresponding to the first database operation statement type and the host variables in the first database operation record associated with the transaction identifier.

6. A method in accordance with claim 5, wherein updating a list entry in the open transactions data structure comprises identifying the linked list head associated with the transaction identifier and linking, to the last linked list entry of the linked list, a new linked list entry corresponding to the database operation statement type and the host variables in the database operation record associated with the transaction identifier.

* * * * *